United States Patent [19]

Seki et al.

[11] Patent Number: 4,717,441
[45] Date of Patent: Jan. 5, 1988

[54] LAMINATOR

[75] Inventors: Mitsuhiro Seki, Tokyo; Fumio Hamamura, Kanagawa, both of Japan

[73] Assignee: Somar Corporation, Tokyo, Japan

[21] Appl. No.: 886,297

[22] Filed: Jul. 16, 1986

[51] Int. Cl.$^4$ .............................................. B32B 31/10
[52] U.S. Cl. .................................... 156/521; 156/522; 156/556
[58] Field of Search ............... 156/521, 522, 552, 556, 156/555; 83/152, 154

[56] References Cited

U.S. PATENT DOCUMENTS

| 4,025,380 | 5/1977 | Bernardo | 156/361 X |
| 4,491,492 | 1/1985 | Hetherington | 156/521 X |
| 4,519,865 | 5/1985 | Bradler et al. | 156/521 X |
| 4,585,509 | 4/1986 | Obayashi | 156/522 X |

Primary Examiner—David Simmons
Attorney, Agent, or Firm—Sughrue, Mion, Zinn, Macpeak and Seas

[57] ABSTRACT

A laminator for depositing sheets cut from a web into desired lengths onto a base panel using press rolls installed opposite to each other with respect to the base panel and for transferring the base panel deposited with the cut sheets, characterized in that web support means are respectively installed close to the circumferential surfaces of said press roll and moved at the same rate as or slightly lower rate than a circumferential speed of the press roll up to positions close to the contacts between the cut sheets on the base panel and the press roll while the trailing edges of the cut sheets or portions close to the trailing edges thereof are being supported by the web support means.

2 Claims, 9 Drawing Figures

LAMINATOR

BACKGROUND OF THE INVENTION

This invention relates to a laminator for depositing sheets cut from a supply web into desired individual lengths onto a base panel continuously and automatically.

Conventionally, a laminator is designed to apply sheets cut into desired lengths onto a base panel through consecutive steps of transferring the cut leading edge of a supply web to the base panel in motion using vacuum plates, sticking the leading edge thereof onto one end of the base panel, pressing the base panel stuck with the edge of the cut sheet by a pair of rollers for successively press sealing the web onto the base panel as the base panel moves on, temporarily stopping the movement of rollers and the base panel when the rollers approach the other end of the base panel, cutting the web before the base panel in the state wherein the rollers are caused to stop, press sealing the remainder of the cut sheet, which has been cut apart but not yet press sealed, onto the base panel starting to move again, and sending the base panel already press sealed with the cut sheet to the next process. (See U.S. Pat. No. 4,025,380).

In the above conventional apparatus, a vacuum shoe is provided to draw the trailing edge of the cut sheet until it contacts the panel surface. However, the vacuum shoe is stationally disposed, so that it must be extended from cutter means to the panel transport path in order to prevent the trailing edge from dropping onto the panel and wrinkling of the sheet from occurring. That is, the vacuum shoe needs a large space and it is impossible to reduce the distance between a position where the leading edge of the sheet is stuck onto the leading edge of the panel and a position where the leading edge of the panel stuck onto the leading edge of the sheet is pressed by a pair of rollers. Accordingly, the panel, especially when it is thin, is bent by the act of the gravity and abuts on the rollers in such a state that the leading end of the panel slips off the center of the pair of rollers. As a result, wrinkling of the sheet frequently occurs.

SUMMARY OF THE INVENTION

An object of the present invention is to provide a laminator free from the above-described shortcomings, wherein web support means are respectively provided close to the circumferential surfaces of press rolls, the web support means being moved, at the same rate as or slightly lower rate than a circumferential speed of the press roll, up to a position close to the contacts between cut sheets on a base panel and the press rolls while the trailing edges of the sheets cut into desired length or portions close to the trailing edges (hereinafter simply referred to as the trailing edge) are supported thereby.

In the laminator thus constructed, the webs sent out of the wind-up rolls are respectively laminated onto the base panels by the press rolls and cut by cutters installed closely to the press rolls when the desired quantity of the webs have been fed. The trailing edges of cut sheets are moved to the position close to the base panel along the circumferential surfaces of the press rolls at the same rate as or slightly lower rate than the circumferential speed of the press roll while being supported by the web support means installed close to the circumferential surfaces of the press rolls.

As the leading portions of the cut sheets are respectively forced to move forth while being pressed by the press roll, the trailing edges of the cut sheets thus transferred to the position close to the base panel will be separated from the support means without trouble and sent onto the base panel even though the support means exerts the support force to the cut sheets.

The trailing edges of the cut sheets are prevented from drooping so that the sheets press sealed by the press rolls are free from wrinkles or air bubbles.

Since the moving rate of the web support means is the same as or slightly lower than the circumferential speed of the press roll, the cut sheets are being tensed by the press rolls during the movement of the trailing edges of the cut sheets and consequently made free from sagging or wrinkles.

The web support means are respectively moved back to the original positions after the trailing edges of sheets are separated from the support means and sent out by the press rolls.

BRIEF DESCRIPTION OF THE DRAWINGS

FIGS. 2(A) through 2(D) are diagrams illustrating the operation of the support means of FIG. 1, FIGS. 3 and 5 are side views illustrating laminators, each using the support means of FIG. 1 for supporting the trailing edge of the cut sheet.

DETAILED DESCRIPTION OF THE INVENTION

Figure 1:
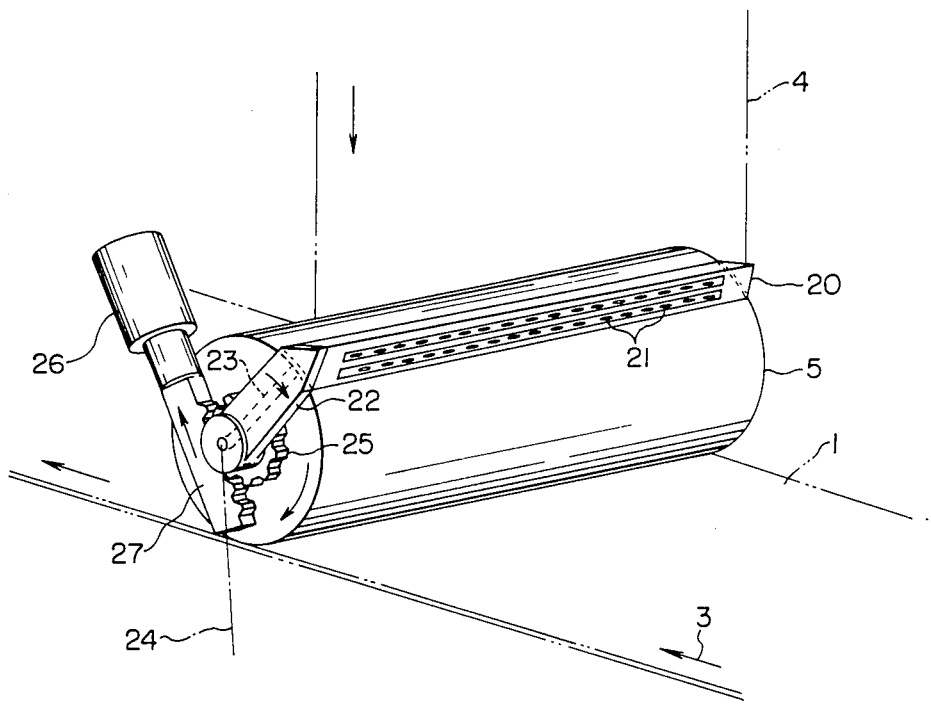
FIG. 1 is a perspective view illustrating support means for supporting the trailing edge of a sheet cut from a web in a laminator embodying the present invention.

Referring now to the drawings, an embodiment of the present invention will be described.

FIG. 1 is an enlarged perspective view showing support means for supporting the trailing edges of sheets cut from a web in a laminator embodying the present invention, wherein only one of the pair of press rolls is illustrated. In FIG. 1, there is shown a base panel 1 fed by feed rollers (2 of FIG. 3) in the direction of an arrow 3. A web 4 sent from the upside is transferred toward the left side of FIG. 1 by feed rollers (6 of FIG. 3) while the web is being press sealed by the press roll 5 consisting of an induction heat jacket roller as in the case of a conventional laminator. A web suction member 20 is installed close to the circumferential surface of the press roll 5.

The web suction member 20 is formed of a hollow body having a width roughly equal to that of the press roll 5 and triangular in cross section with a number of suction holes 21 in one side, the suction member 20 being supported by support arms 22 installed in parallel to both sides of the press roll 5. There is provided a through-hole 23 communicating with the chamber in the web suction member 20 in each arm 22 and with a vacuum source such as an external vacuum pump through a conduit 24 so as to make the inside chamber of the web suction member 20 vacuous. A gear 25 installed in the center of the roll 5 is made to engage with a rack 27 driven by a hydraulic cylinder 26 to rotate the arm 22, so that the web suction member 20 is moved along the circumferential surface of the press roll 5 by the arm 22.

FIGS. 2(A)–2(D) illustrate how the trailing edge of the sheet cut from a web is moved by the web suction member 20. FIG. 2(A) shows a state wherein the web 4 is cut into the sheet by a cutter 16 and the trailing edge 4a of the cut sheet is sucked to the suction holes 21 of the web suction member 20; FIG. 2(B) shows a state wherein the web suction member 20 has turned through about 45° at the same rate as or slightly lower rate than the circumferential speed of the press roll 5 while the suction member 20 is attracting the trailing edge 4a of the cut sheet; FIG. 2(C) shows a state wherein the web suction member 20 has turned through about 45° and has stopped with a small gap between the web suction member and the base panel so that the trailing edge 4a of the cut sheet is positioned closest to the base panel 1; and FIG. 2(D) shows a state wherein the cut sheet 4 has been forced to be sent out by the press roll 5 in the direction of an arrow. After the cut sheet was sent out, the web suction member 20 is automatically moved back to the original position.

According to this embodiment, the web suction member 20 is so arranged as to move to the position (shown in FIG. 2(C)) close to the contact between the cut sheet on the base panel and the press roll 5 at the same rate or slightly lower rate than the circumferential speed of the press roll while the suction member 20 is holding the trailing edge 4a of the cut sheet. Consequently, the cut sheet 4 is kept drawn by the press roll 5 during the movement of the trailing edge of the cut sheet and therefore the cut sheet is prevented from drooping or wrinkling.

Further, the web suction member can be made compact so that the distance between a position where the leading edge of the web is tentatively bonded to the base panel and a position where the leading end of the base panel bonded with the leading edge of the web abuts on the press rolls, can be made small. Accordingly, even if the base panel is thin, it abuts on the press roll without being bent so that the web can be laminated without wrinkles or the like.

When the trailing edge 4a of the cut sheet separates from the web suction member 20 at the position of FIG. 2(C) where the suction member 20 has been positioned closest to the base panel, that separation will not be affected even if the suction member 20 is allowed to maintain the sucking action by means of vacuum because the pulling force of the press roll 5 is stronger. The sucking action may be interrupted at the separation of the cut sheet from the web suction member.

Moreover, the shape of the suction member 20 should preferably be such that the cut sheet is separated from the suction member 20 in such a state that the cut sheet is positioned closest to the base panel 1.

Figure 3:
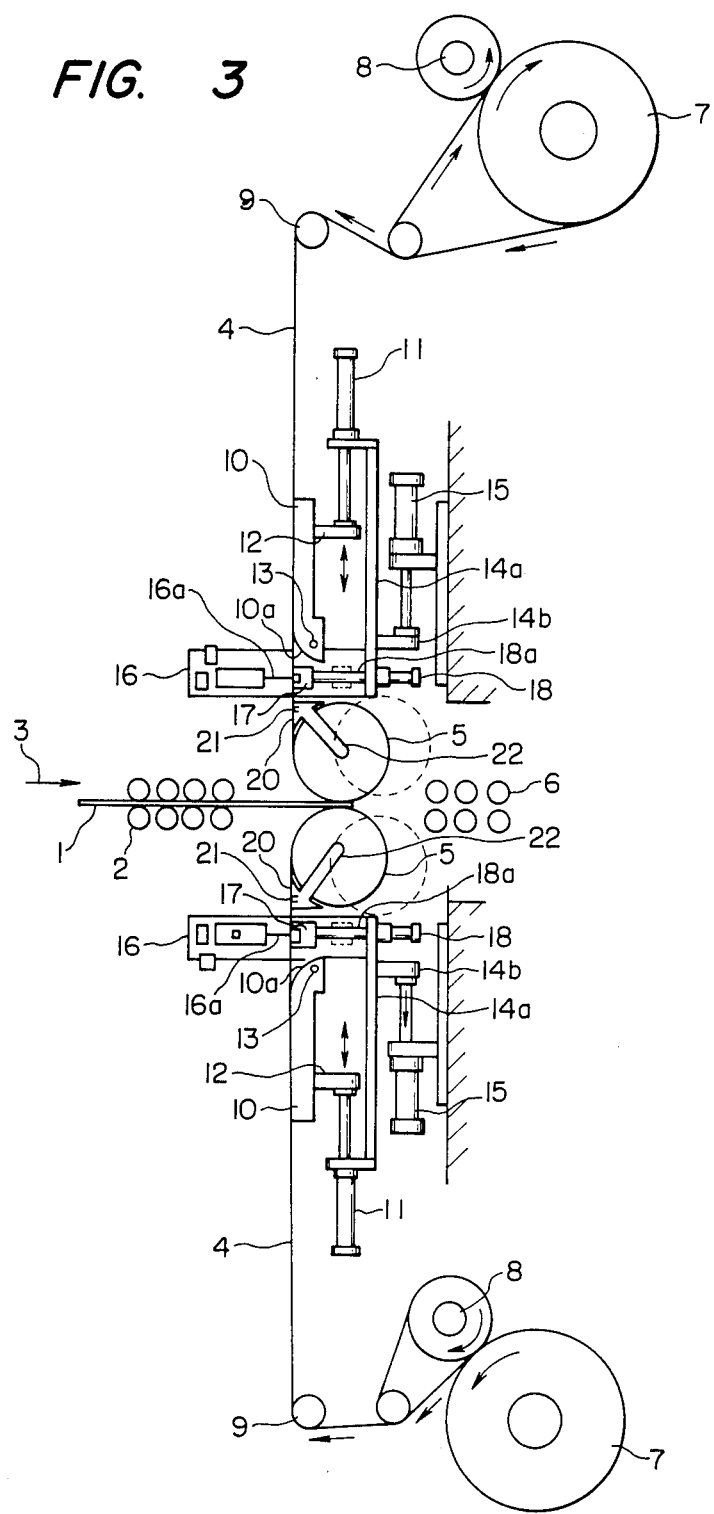

FIG. 3 is a side view of a laminator employing the suction member of FIG. 1 according to the present invention for attracting a sheet cut from a web while the web and the base panel are kept moving when the web is cut.

In FIG. 3, like reference characters designate like or corresponding parts of FIG. 1. Since the apparatus according to the present invention has been so constructed that parts on both upper and lower sides are symmetrical, only those located above the base panel 1 will be described for explanatory convenience.

In FIG. 3, the web comprises three layers: a polyethylene layer as a surface layer, a photoresist layer as an intermediate layer and a polyethylene terephthalate layer, the web being wound on a wind-up roll 7. In addition, a wind-up roll 8 is used to remove the polyethylene layer from the web. A tension roller 9 moving up and down is also installed to impart a predetermined tension to the web and to guide it.

A vacuum plate 10 incorporating a vacuum chamber and exerting the sucking force on its surface is installed right under the tension roller 9 and is coupled to a piston rod of a first air cylinder 11 through a connecting member 12 so as to move in the vertical direction. The web 4 is attracted by the vacuum plate 10 when its vacuum chamber is coupled to a vacuum source (not shown).

The first air cylinder 11 is coupled to a second air cylinder 15 through connecting members 14a and 14b. A rotary cutting device 16, a subvacuum plate 17 positioned opposite to the cutter 16a of the cutting device 16 and under the tip 10a of the main vacuum plate 10, the surface of the subvacuum plate 17 having suction function, and a third air cylinder 18 for operating the subvacuum plate 17 in the horizontal direction through a piston rod 18a are coupled to the second air cylinder 15 through the same connecting members 14a and 14b. The tip of the main vacuum plate 10 is shaped in the form of an arc and contains a heater 13.

The press roll 5 equipped with the web suction member 20 as web support means according to the present invention is installed under the subvacuum plate 17.

The operation of the laminator thus constructed will subsequently be described. Although only the portions above the base panel will be referred to for explanatory convenience, the portions under the base panel will also operate in the same way. (i) The polyethylene layer is first removed from the three layers of the web 4 wound on the roll 7 using the wind-up roller 8 and the leading edge of the web 4 is manually pulled down to the position of the lower end 10a of the main vacuum plate 10, i.e., the position of the cutter 16a via the tension roller 9. (ii) When the base panel 1 is transferred to a predetermined position by feed rollers 2, the subvacuum plate 17 attracts the leading edge of the web 4 manually pulled down or cut apart by the cutter 16a in case of continuous operation by its suction force as the interior of the subvacuum plate 17 communicates with the vacuum source. The subvacuum plate 17 attracting the web is moved back by the third air cylinder 18 for a predetermined distance. The leading edge of the web 4 is detached from the subvacuum plate and is sucked to the arc-shaped face of the tip 10a of the main vacuum plate 10 exerting the suction force. (iii) The first air cylinder 11 is then operated so as to pull down the web 4 attached to the main vacuum plate 10 exerting the suction force, particularly to the arc-shaped part 10a thereof, up to the position of the base panel where the web is tentatively bonded to the base panel 1 with pressure and heat. (iv) After the leading edge of the web is tentatively heat-bonded, the main vacuum plate 10 is raised from the base panel 1 by means of the first air cylinder 11 while the web 4 is freed by stopping the vacuum sucking action of the main vacuum plate 10. At the same time, the second air cylinder 15 is also operated, whereby the rotary cutting device 16, the subvacuum plate 17 and the connecting member 14a of the first air cylinder 11 are also upwardly moved apart from the base panel 1. (v) When the main vacuum plate 10 is upwardly moved apart from the base panel 1 by a given length, the press roll 5 moves toward the base panel 1 and rotates while clamping the base panel 1 on which the leading edge of the web 4 has tentatively been heat-bonded. The press roll 5 starts to press seal and transfer the panel is bonded with the web 4 so that the web is continuously laminated on the panel. At that time, the subvacuum plate 17 is caused to stop exerting the suction force and returns to the left-hand original position opposite to the cutter 16a. (vi) When the trailing edge of the cut sheet is detected by a sensor (not shown), the second air cylinder 15 operates, causing the mechanism to move down and approach the base panel 1. Then, the web 4 is attracted by the main vacuum plate 10 and the subvacuum plate 17 and, during the downward stroke by means of the second air cylinder 15, the rotary cutter 16a is moved in the direction perpendicular to the drawing to cut the web 4. The piston speed of the second air cylinder 15 is set at slightly higher speed than the circumferential speed of the press roll 5 so that allowance for sagging may be provided for the web by that extent. The web 4 may be cut by the rotary cutter 16 immediately after the completion of the downward stroke of the second air cylinder 15 while the web is sagging. (vii) The web suction member 20 as one of the web support means cooperating with the press roll 5 is used to prevent the cut sheet from drooping and provide normal press sealing of the trailing edge of the cut sheet on the base panel without air bubbles or wrinkles.

Figure 4:
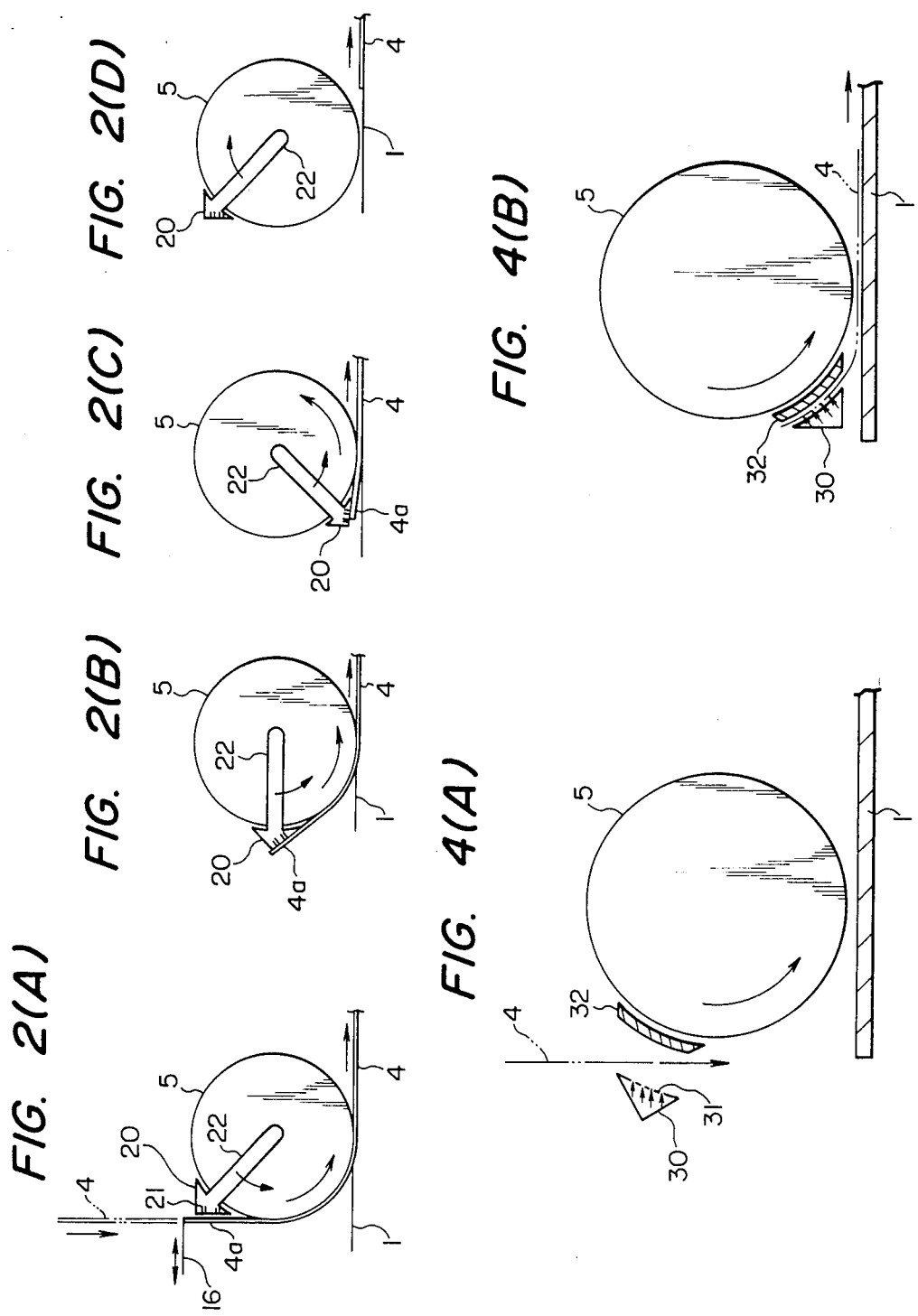
FIGS. 4(A) and 4(B) are diagrams illustrating the operation of another support means embodying the present invention.

In the above embodiment, although a description has been given to a web suction member for supporting the trailing edge of the cut sheet by making use of suction force as web support means, it represents only an embodiment and, as shown in FIGS. 4(A) and 4(B) (FIG. 4(A) shows a state wherein the web 4 is continuously moved and FIG. 4(B) shows a state corresponding to that shown in FIG. 2(C)), there may be installed a blow member 30 with compressed air outlets 31 made in one face and a bearing member 32, the gap between the blow member 30 and the bearing member 32 being variable. The web 4 is passed through the gap and, when the trailing edge of the cut sheet is located in the gap, the blow member 30 moves (forward) from the position shown in FIG. 4(A) in such a manner as to narrow the gap and support the cut sheet by blowing the compressed air through the air outlets 31 and pressing the cut sheet against the bearing member 32 as shown in FIG. 4(B). Also, a holding member in place of the blow member 30 may be used to hold the trailing edge of the cut sheet by displacing the holding member in such a manner as to come close to the bearing member and hold the trailing edge of the cut sheet gently.

As set forth above, according to the present invention the trailing edge of cut sheets are respectively moved close to the contacts between the cut sheets on a base panel and press rolls at the same rate as or slightly lower rate than a circumferential speed of the press roll to prevent the cut sheets from drooping and ensure a normal press sealing of the trailing edges of the cut sheets onto the base panel without air bubbles or wrinkles.

Further, the web suction member can be made compact so that the distance between a position where the leading edge of the web is tentatively bonded to the base panel and a position where the leading end of the base panel bonded with the leading edge of the web abuts on the press rolls, can be made small. Accordingly, even if the base panel is thin, it abuts on the press roll without bent so that a web can be laminated without wrinkle or the like.

Figure 5:
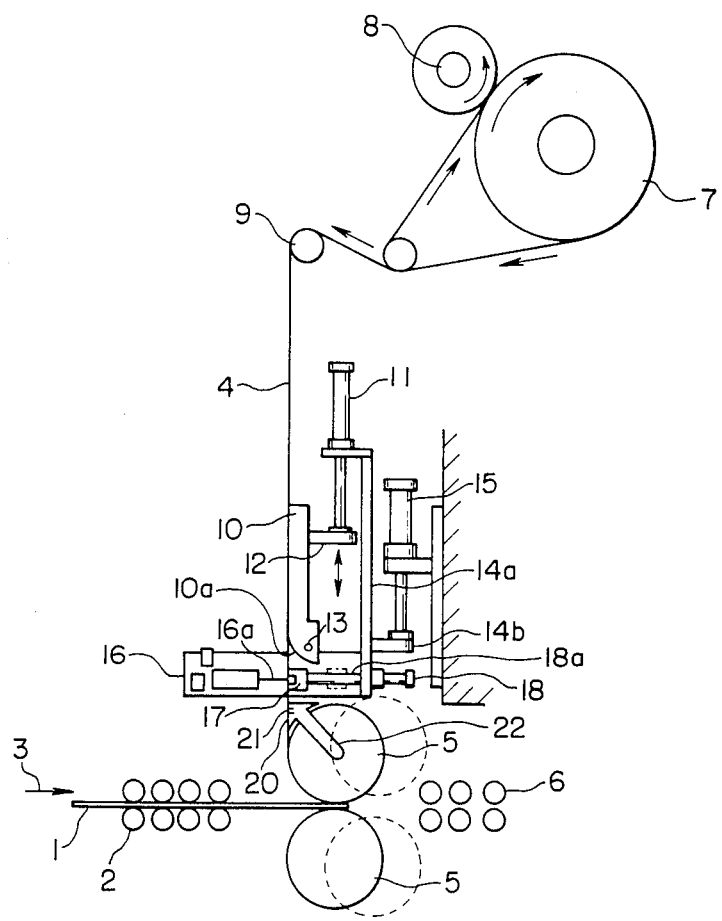

In the above description, we have discussed a laminator for depositing cut sheets onto both sides of a base panel. However, a laminator may be one as shown in FIG. 5 in which a cut sheet is deposited onto only one side of a panel.

What is claimed is:

1. A laminator for continuously and automatically depositing a sheet cut into desired length from a web (4) onto a side of a base panel (1), comprising:
    (a) means (10) for holding a leading edge of said web;
    (b) means (11) for transferring said holding means and attendantly said held leading edge of the web toward said base panel so that the leading edge of said web is tentatively bonded to said base panel;
    (c) a pair of press rolls (5) for press sealing said web onto said base panel;
    (d) cutter means (16) for cutting said web into a cut sheet, said cutter means being disposed near a tip (10a) of said holding menas;
    (e) cut sheet support means (20) for retentively supporting a trailing edge of said cut sheet and smoothly guiding said trailing edge into a nip between said base panel and an associated one of said press rolls, said support means being configured as a yoke comprising a hollow central member extending axially across said one press roll proximate an outer surface thereof, a pair of parallel, radially oriented mounting arms (22) coupled at one ends thereof to ends of the central member and pivotally journaled at other, opposite ends about an axis of said one press roll, a plurality of suction holes (21) defined in and extending across said central member, and means (23) for communicating a vacuum to said central member; and
    (f) means (25-27) for rotatably driving said support means about said axis at a speed equal to or slightly lower than a circumferential speed of said one press roll such that said retained trailing sheet edge is prevented from becoming wrinkled as it enters said nip.

2. A laminator for continuously and automatically depositing a sheet cut into desired length from a web (4) onto a single side of a base panel (1), comprising:
    (a) means (10) for holding a leading edge of said web;
    (b) means (11) for transferring said holding means and attendantly said leading edge of the web toward said base panel so that the leading edge of said web is tentatively bonded to said base panel;
    (c) a pair of press rolls (5) for press sealing said web onto said base panel;
    (d) cutter means (16) for cutting said web into a cut sheet, said cutter means being disposed near a tip (10a) of said holding means; and
    (e) cut sheet support means for retentively supporting a trailing edge of said cut sheet and smoothly guiding said trailing edge into a nip between said base panel and an associated one of said press rolls, said cut sheet support means comprising a blow member (30) and a bearing member (32), air outlets (31) being provided in said blow member for having compressed air being blown through said outlets toward said bearing member so that said trailing edge of said cut sheet is supported by said cut sheet support means, said web support means being disposed close to a circumferential surface of said one press roll and moving at a speed equal to or slightly lower than a circumferential speed of said one press roll while the trailing edge of said cut sheet is supported by said support means.

* * * * *